(12) United States Patent
Hundemer

(10) Patent No.: US 9,942,589 B2
(45) Date of Patent: *Apr. 10, 2018

(54) SYSTEM AND METHOD FOR SCHEDULING CLIPS

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/438,740

(22) Filed: Feb. 21, 2017

(65) Prior Publication Data

US 2017/0164031 A1    Jun. 8, 2017

Related U.S. Application Data

(63) Continuation of application No. 14/208,898, filed on Mar. 13, 2014, now Pat. No. 9,615,118.

(51) Int. Cl.
*H04N 9/80* (2006.01)
*H04N 21/262* (2011.01)
(Continued)

(52) U.S. Cl.
CPC ....... *H04N 21/26258* (2013.01); *G11B 27/34* (2013.01); *H04N 9/87* (2013.01); *H04N 21/84* (2013.01)

(58) Field of Classification Search
CPC ... G11B 27/105; G11B 27/329; G11B 27/034; H04N 5/85; H04N 9/8042
(Continued)

(56) References Cited

U.S. PATENT DOCUMENTS 6,049,332 A * 4/2000 Boetje ............... G11B 27/105
345/6
2003/0001880 A1    1/2003 Holtz
(Continued)

OTHER PUBLICATIONS

Office Action dated Oct. 21, 2015 issued in U.S. Appl. No. 14/208,933.
(Continued)

*Primary Examiner* — William Tran
(74) *Attorney, Agent, or Firm* — McDonnell Boehnen Hulbert & Berghoff LLP

(57) ABSTRACT

An example method involves: accessing a first list that includes ordered clip identifiers $C_1 \ldots C_n$ separated at least into a first block of clip identifiers $C_1 \ldots C_j$ and a second block of clip identifiers $C_{j+1} \ldots C_k$; accessing a second list that includes ordered player identifiers $P_1 \ldots P_x$; assigning to each clip identifier $C_1 \ldots C_j$ in order a respective one of the player identifiers $P_1 \ldots P_x$ selected in an ordered and looping fashion starting with one of the player identifiers $P_1 \ldots P_x$; assigning to each clip identifier $C_{j+1} \ldots C_k$ in order a respective one of the player identifiers $P_1 \ldots P_x$ selected in an ordered and looping fashion starting with the player identifier $P_1$; and traversing the clip identifiers $C_1 \ldots C_k$, and for each traversed clip identifier, causing a player identified by the one of the player identifiers $P_1 \ldots P_x$ assigned to the traversed clip identifier to load a clip identified by the traversed clip identifier.

22 Claims, 10 Drawing Sheets

(51) Int. Cl.
  *G11B 27/34* (2006.01)
  *H04N 9/87* (2006.01)
  *H04N 21/84* (2011.01)

(58) Field of Classification Search
  USPC .......................................................... 386/241
  See application file for complete search history.

(56) References Cited

U.S. PATENT DOCUMENTS

| | | | |
|---|---|---|---|
| 2003/0156824 A1* | 8/2003 | Lu ........................ | G11B 27/105 386/230 |
| 2008/0034093 A1 | 2/2008 | Sutou | |
| 2008/0244605 A1* | 10/2008 | Bennington ........... | G06Q 10/06 705/7.14 |
| 2014/0109154 A1 | 4/2014 | Basse et al. | |
| 2014/0258450 A1* | 9/2014 | Suryanarayanan . | H04L 67/1097 709/217 |
| 2015/0160977 A1 | 6/2015 | Accapadia et al. | |
| 2015/0294025 A1 | 10/2015 | Wellen et al. | |

OTHER PUBLICATIONS

Office Action dated Oct. 21, 2015 issued in U.S. Appl. No. 14/209,190.
Hundemer, Hank J., U.S. Appl. No. 14/208,933, filed Mar. 13, 2014.
Hundemer, Hank J., U.S. Appl. No. 14/209,190, filed Mar. 13, 2014.
Final Office Action dated May 4, 2016 issued in U.S. Appl. No. 14/208,933.
Final Office Action dated May 2, 2016 issued in U.S. Appl. No. 14/209,190.

* cited by examiner

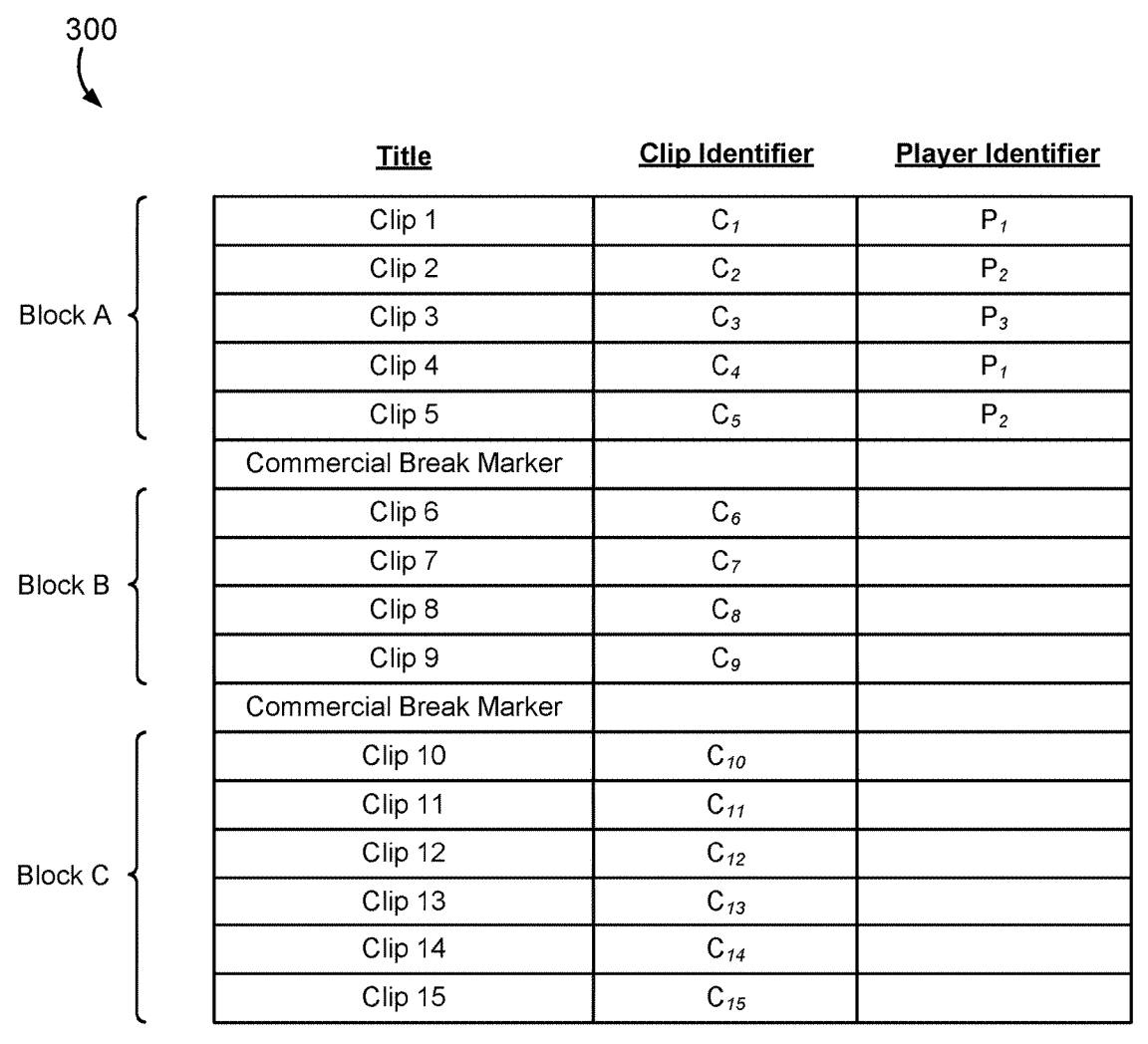

| Title | Clip Identifier | Player Identifier |
|---|---|---|
| Clip 1 | $C_1$ | $P_1$ |
| Clip 2 | $C_2$ | $P_2$ |
| Clip 3 | $C_3$ | $P_3$ |
| Clip 4 | $C_4$ | $P_1$ |
| Clip 5 | $C_5$ | $P_2$ |
| Commercial Break Marker | | |
| Clip 6 | $C_6$ | |
| Clip 7 | $C_7$ | |
| Clip 8 | $C_8$ | |
| Clip 9 | $C_9$ | |
| Commercial Break Marker | | |
| Clip 10 | $C_{10}$ | |
| Clip 11 | $C_{11}$ | |
| Clip 12 | $C_{12}$ | |
| Clip 13 | $C_{13}$ | |
| Clip 14 | $C_{14}$ | |
| Clip 15 | $C_{15}$ | |

300

Block A (Clips 1–5), Block B (Clips 6–9), Block C (Clips 10–15)

FIG. 3B

| Title | Clip Identifier | Player Identifier |
|---|---|---|
| Clip 1 | $C_1$ | $P_1$ |
| Clip 4 | $C_4$ | $P_1$ |
| Clip 5 | $C_5$ | $P_2$ |
| Commercial Break Marker | | |
| Clip 6 | $C_6$ | $P_1$ |
| Clip 7 | $C_7$ | $P_2$ |
| Clip 8 | $C_8$ | $P_3$ |
| Clip 9 | $C_9$ | $P_1$ |
| Commercial Break Marker | | |
| Clip 10 | $C_{10}$ | $P_1$ |
| Clip 11 | $C_{11}$ | $P_2$ |
| Clip 12 | $C_{12}$ | $P_3$ |
| Clip 13 | $C_{13}$ | $P_1$ |
| Clip 14 | $C_{14}$ | $P_2$ |
| Clip 15 | $C_{15}$ | $P_3$ |

Block A: Clips 1, 4, 5
Block B: Clips 6–9
Block C: Clips 10–15

SYSTEM AND METHOD FOR SCHEDULING CLIPS

RELATED DISCLOSURE

This disclosure is a continuation of U.S. patent application Ser. No. 14/208,898 filed on Mar. 13, 2014.

USAGE AND TERMINOLOGY

Throughout this application, with respect to all reasonable derivatives of such terms, and unless otherwise specified (and/or unless the particular context clearly dictates otherwise), each usage of:

"a" or "an" means at least one.
"the" means the at least one.
"video" means any material represented in a video format (i.e., having multiple frames). In some instances, video may include multiple sequential frames that are identical or nearly identical, and that may give the impression of a still image. Video may or may not include an audio portion.
"clip" means a portion of video.
"player" means a video player.

TECHNICAL FIELD

The disclosed system and method relate generally to scheduling clips, such as in connection with a news production system.

BACKGROUND

Unless otherwise indicated herein, the materials described in this section are not prior art to the claims in this disclosure and are not admitted to be prior art by inclusion in this section.

A news production system (NPS) may facilitate the production of a news program for television broadcast. In this context, the news program may be produced in accordance with a "rundown." Generally, a rundown is a schedule of events (and related information) that make up a news program. For instance, a rundown may indicate that various clips are to be loaded and played out by a player in a particular order so that the clips may be part of the news program.

For a variety of reasons, it may take several seconds for a player to load a clip. Also, a player may be configured such that it may either load or playout a clip (but not both together) at any given time. Therefore, there may be a delay between the time that a particular player finishes playing out a first clip and the time that the player may begin playing out a second clip (i.e., to allow the player sufficient time to load the second clip). Such a delay may be problematic, such as where a rundown indicates that the second clip should be played out immediately after the first clip (i.e., without any intervening delay).

SUMMARY

In one aspect, an example method involves: (i) accessing a first list that includes ordered clip identifiers $C_1 \ldots C_n$ separated at least into a first block of clip identifiers $C_1 \ldots C_j$ and a second block of clip identifiers $C_{j+1} \ldots C_k$; (ii) accessing a second list that includes ordered player identifiers $P_1 \ldots P_x$, wherein $x<k$; (iii) assigning to each clip identifier $C_1 \ldots C_j$ in order a respective one of the player identifiers $P_1 \ldots P_x$ selected in an ordered and looping fashion starting with one of the player identifiers $P_1 \ldots P_x$ such that the clip identifier $C_j$ is assigned one of the player identifiers $P_1 \ldots P_{x-1}$; (iv) assigning to each clip identifier $C_{j+1} \ldots C_k$ in order a respective one of the player identifiers $P_1 \ldots P_x$ selected in an ordered and looping fashion starting with the player identifier $P_1$; and (v) traversing the clip identifiers $C_1 \ldots C_k$, and for each traversed clip identifier, causing a player identified by the one of the player identifiers $P_1 \ldots P_x$ assigned to the traversed clip identifier to load a clip identified by the traversed clip identifier.

In another aspect, an example method involves: (i) accessing a first list that includes ordered clip identifiers separated at least into a first block of clip identifiers and a second block of clip identifiers; (ii) accessing a second list that includes ordered player identifiers, wherein the number of player identifiers is less than the number of clip identifiers in the first and second blocks combined; (iii) assigning to each clip identifier in the first block in order a respective one of the player identifiers selected in an ordered and looping fashion starting with one of the player identifiers such that a final clip identifier in the first block is assigned one of the player identifiers other than a final one of the player identifiers; (iv) assigning to each clip identifier in the second block in order a respective one of the player identifiers selected in an ordered and looping fashion starting with an initial one of the player identifiers; and (v) traversing the ordered clip identifiers in the first block and the second block, and for each traversed clip identifier, causing a player identified by the one of the player identifiers assigned to the traversed clip identifier to load a clip identified by the traversed clip identifier.

In another aspect, a system is disclosed. The system includes multiple players and a computer-readable medium including a set of program instructions, that when executed, cause performance of a set of functions including: (i) accessing a first list that includes ordered clip identifiers $C_1 \ldots C_m$ separated at least into a first block of clip identifiers $C_1 \ldots C_j$ and a second block of clip identifiers $C_{j+1} \ldots C_k$; (ii) accessing a second list that includes ordered player identifiers $P_1 \ldots P_x$, wherein each player identifier $P_1 \ldots P_x$ has a corresponding one of the players, and wherein $x<k$; (iii) assigning to each clip identifier $C_1 \ldots C_j$ in order a respective one of the player identifiers $P_1 \ldots P_x$ selected in an ordered and looping fashion starting with one of the player identifiers $P_1 \ldots P_x$ such that the clip identifier $C_j$ is assigned one of the player identifiers $P_1 \ldots P_{x-1}$; (iv) assigning to each clip identifier $C_{j+1} \ldots C_k$ in order a respective one of the player identifiers $P_1 \ldots P_x$ selected in an ordered and looping fashion starting with the player identifier $P_1$; and traversing the clip identifiers $C_1 \ldots C_k$, and for each traversed clip identifier, causing a player identified by the one of the player identifiers $P_1 \ldots P_x$ assigned to the traversed clip identifier to load a clip identified by the traversed clip identifier.

These, as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 3B is a diagram of the example rundown of FIG. 3A, in a second state.

FIG. 3E is a diagram of the example rundown of FIG. 3A, in a fifth state.

DETAILED DESCRIPTION OF THE DRAWINGS

I. Overview

Figure 1:
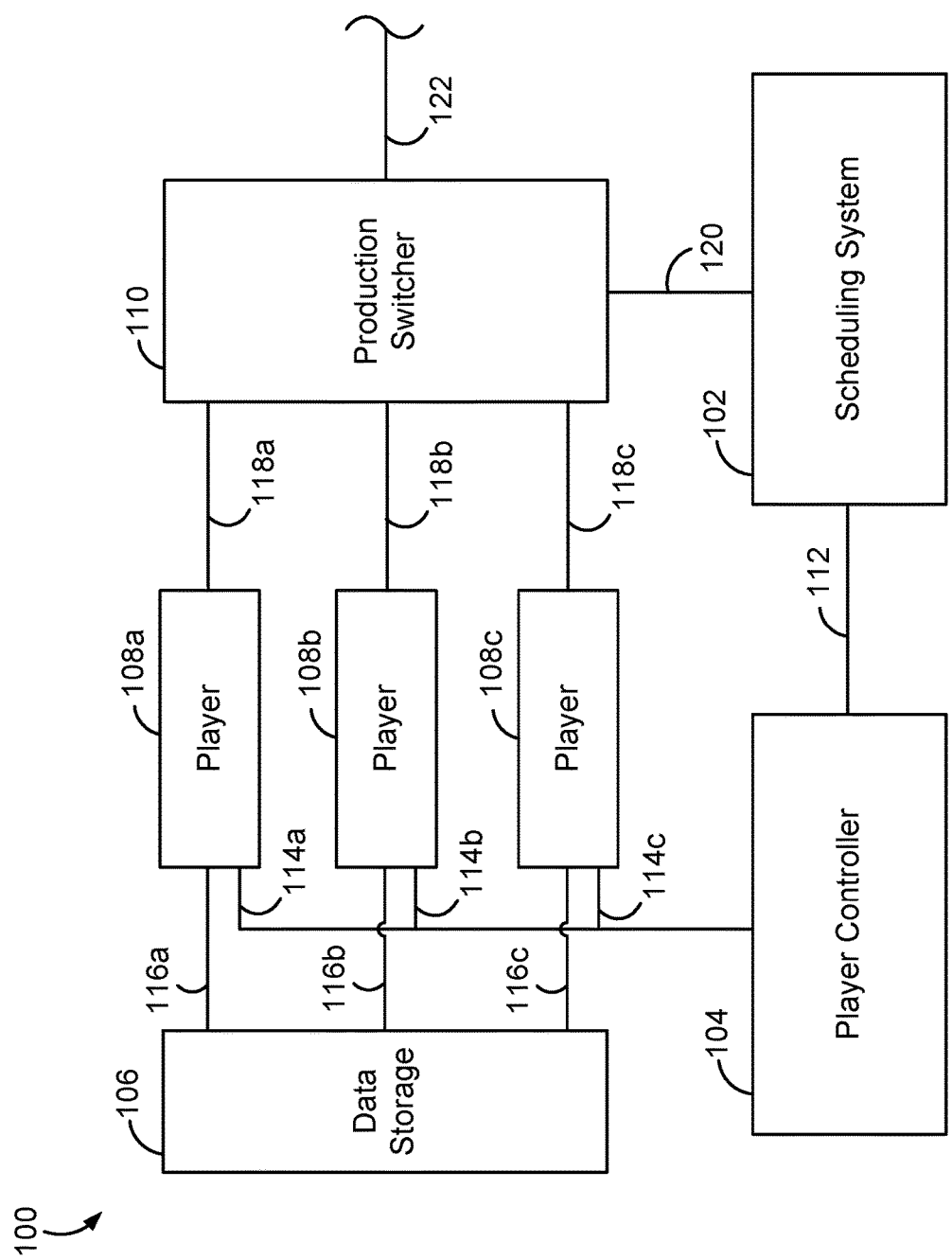
FIG. 1 is a simplified diagram of an example NPS.

As discussed above, in the context of an NPS, there may be a delay between the time that a particular player finishes playing out a first clip and the time that the player may begin playing out a second clip. To help address this issue, an NPS may use multiple players to load and playout clips indicated in a rundown.

With this configuration, a user may assign to each clip, a respective player in such a manner so as to reduce or avoid the delay issue discussed above. Note that in a rundown, players may be identified by player identifiers and clips may be identified by clip identifiers. As such, the process of a user assigning a player to a clip may involve the user editing the rundown to indicate that a particular player identifier is assigned to a particular clip identifier.

To illustrate how a user may assign players to clips in a manner that reduces or avoids the delay issue discussed above, consider an NPS that includes two players. In this instance, a user may assign to clips in a rundown, one of two players selected in an alternating fashion. Therefore, while a first player is playing out a first clip, a second player may load a second clip. And when the first player finishes playing out the first clip, the second player may immediately start playing out the second clip. This process may be repeated such that each pair of ordered clips may be played out in order and without any intervening delay.

In some cases, such as where the first clip has a short duration, it may take longer for the second player to load the second clip than it takes for the first player to playout the first clip. Therefore, in some instances an NPS may need to use three or more players to reduce or avoid the delay issue discussed above. However, as an NPS uses more players in this manner, it may become difficult for a user to determine which players should be assigned to which clips to further this goal.

This process may be further complicated by the fact that a rundown may be edited after players have already been assigned to clips. Indeed, in some instances, a rundown may even be edited while the news program is being produced.

Examples of the disclosed system and method may help address the delay issue discussed above by improving the manner in which players are assigned to clips. In one example, a scheduling system may improve this process by leveraging the manner in which clip identifiers are commonly organized within a rundown.

Notably, a news program is typically divided by one or more commercial breaks into separate "blocks." This may also be reflected in the corresponding rundown. For example, the rundown may include one or more commercial break markers that divide the rundown into separate blocks.

Since a rundown may include ordered clip identifiers as described above, the clip identifiers may also be separated into separate blocks, where each block of clip identifiers corresponds to clips in a respective block of the news program.

As disclosed herein, one example method may involve a scheduling system assigning a player identifier to a clip identifier based on a block to which the clip identifier belongs and/or based on the clip identifier's ordered position within that block.

More particularly, an example method may involve a scheduling system accessing a first list that includes ordered clip identifiers $C_1 \ldots C_n$ separated at least into a first block of clip identifiers $C_1 \ldots C_j$ and a second block of clip identifiers $C_{j+1} \ldots C_k$. For instance, the first list may include ordered clip identifiers $C_1 \ldots C_9$, the first block may include clip identifiers $C_1 \ldots C_5$ and the second block may include clip identifiers $C_6 \ldots C_9$.

The example method may further involve the scheduling system accessing a second list that includes ordered player identifiers $P_1 \ldots P_x$. For instance, the second list may include player identifiers $P_1 \ldots P_3$.

Further, the example method may involve the scheduling system assigning to each clip identifier $C_1 \ldots C_j$ in order a respective one of the player identifiers $P_1 \ldots P_x$ selected in an ordered and looping fashion starting with one of the player identifiers $P_1 \ldots P_x$ such that the clip identifier $C_j$ is assigned one of the player identifiers $P_1 \ldots P_{x-1}$. Continuing with the example above, the player identifiers $P_1 \ldots P_3$ may be selected in an ordered and looping fashion starting with the player identifier $P_1$ such that: $C_1$ is assigned $P_1$, $C_2$ is assigned $P_2$, $C_3$ is assigned $P_3$, $C_4$ is assigned $P_1$, and $C_5$ is assigned $P_2$.

The example method may further involve the scheduling system assigning to each clip identifier $C_{j+1} \ldots C_k$ in order a respective one of the player identifiers $P_1 \ldots P_x$ selected in an ordered and looping fashion starting with the player identifier $P_1$. Continuing with the example above, clip identifiers are assigned player identifiers such that: $C_6$ is assigned $P_1$, $C_7$ is assigned $P_2$, $C_8$ is assigned $P_3$, and $C_9$ is assigned $P_1$.

Finally, the example method may involve the scheduling system traversing the clip identifiers $C_1 \ldots C_k$, and for each traversed clip identifier, causing a player identified by the one of the player identifiers $P_1 \ldots P_x$ assigned to the traversed clip identifier to load a clip identified by the traversed clip identifier. This may occur contemporaneously while the players identified by player identifiers $P_1 \ldots P_x$ play out the loaded clips such that the clips may be part of the news program.

Among other things, by "looping" through the player identifiers in the manner described above, a given player has a strong likelihood of having a sufficient amount of time to load a clip before needing to play it out. Indeed, given an NPS with x players, in the general case, once a player has played out a clip, that player need not playout its next clip until x−1 other players have played out x−1 clips, respectively. For instance, as illustrated in the example above (where the NPS uses three players), once a player has played out a clip, that player need not playout its next clip until two other players have played out two other clips, respectively.

Notably, an exception to this general rule may occur when a player plays out two clips that are separated by a commercial break. For instance, as illustrated in the example above, after the player identified as $P_2$ plays out the clip identified as $C_5$, the player waits for only one other player to play one other clip before needing to playout the clip identified as $C_6$. However, the commercial break that separated the clips identified as $C_5$ and $C_6$ helps ensure that the player identified as $P_2$ still has a strong likelihood of having a sufficient amount of time to load the clip identified as $C_6$ before needing to play it out.

Further, by "resetting" the looping of player identifiers at the beginning of each block, there is some predictability as to which players will be assigned to which clips. Indeed, with this approach, a user can generally assume that the first clip after a commercial break will be played out of a particular player (e.g., $P_1$) and that such a player assignment is unlikely to change even if the rundown is later edited.

While in one example, the disclosed method may be implemented in connection with a NPS and a news program, the disclosed method may also be implemented in connection with other types of systems and with other types of programs or other video. For instance, in one example, the disclosed method may be implemented in connection with a master control system.

II. Example NPS

FIG. 1 is a simplified block diagram of an example NPS 100. The NPS 100 may be configured to perform a variety of functions related to producing a news program. The NPS may output the news program in video form, which in turn may be sent to a broadcasting system for broadcast (e.g., via an over-the-air television broadcast or an Internet feed). It is understood that the video output from the NPS 100 may be subjected to additional processing before being broadcast. For example, the video may be modified with a digital video effect (DVE) before being broadcast.

The NPS 100 may include one or more devices, including for example a scheduling system 102, a player controller 104, a data storage 106, one or more players 108a-c, and a production switcher 110. Note that the NPS 100 need not include all of these devices and it may include additional devices.

Generally, the scheduling system 102 is configured to perform functions related to scheduling and managing the production of a news program, the player controller 104 is configured to perform functions related to controlling the players 108a-c, and the production switcher 110 is configured to perform functions related to input-to-output mapping and running DVEs.

Generally, each player 108a-c is configured to perform functions related to loading and/or playing out a clip. Each player 108a-c may take a variety of forms. For instance, each player 108a-c may take the form of a video player device or a software-based video player executing on a computing device.

These devices may communicate with each other and/or with external devices via one or more communication paths. For example, the scheduling system 102 and the player controller 104 may communicate via path 112, the player controller 104 and the players 108a-c may communicate via respective paths 114a-c, and the players 108a-c and the data storage 106 may communicate via respective paths 116a-c. Further, the players 108a-c and the production switcher 110 may communicate via respective paths 118a-c, the scheduling system 102 and the production system 110 may communicate via path 120, and the production switcher 110 may communicate with a device outside of the NPS 100, such as a television broadcasting system, via a path 122.

These devices may communicate with each other and/or with external devices according to one or more protocols. For example, the devices may communicate in accordance with one or more versions of the Media Object Server (MOS) protocol.

Figure 2:
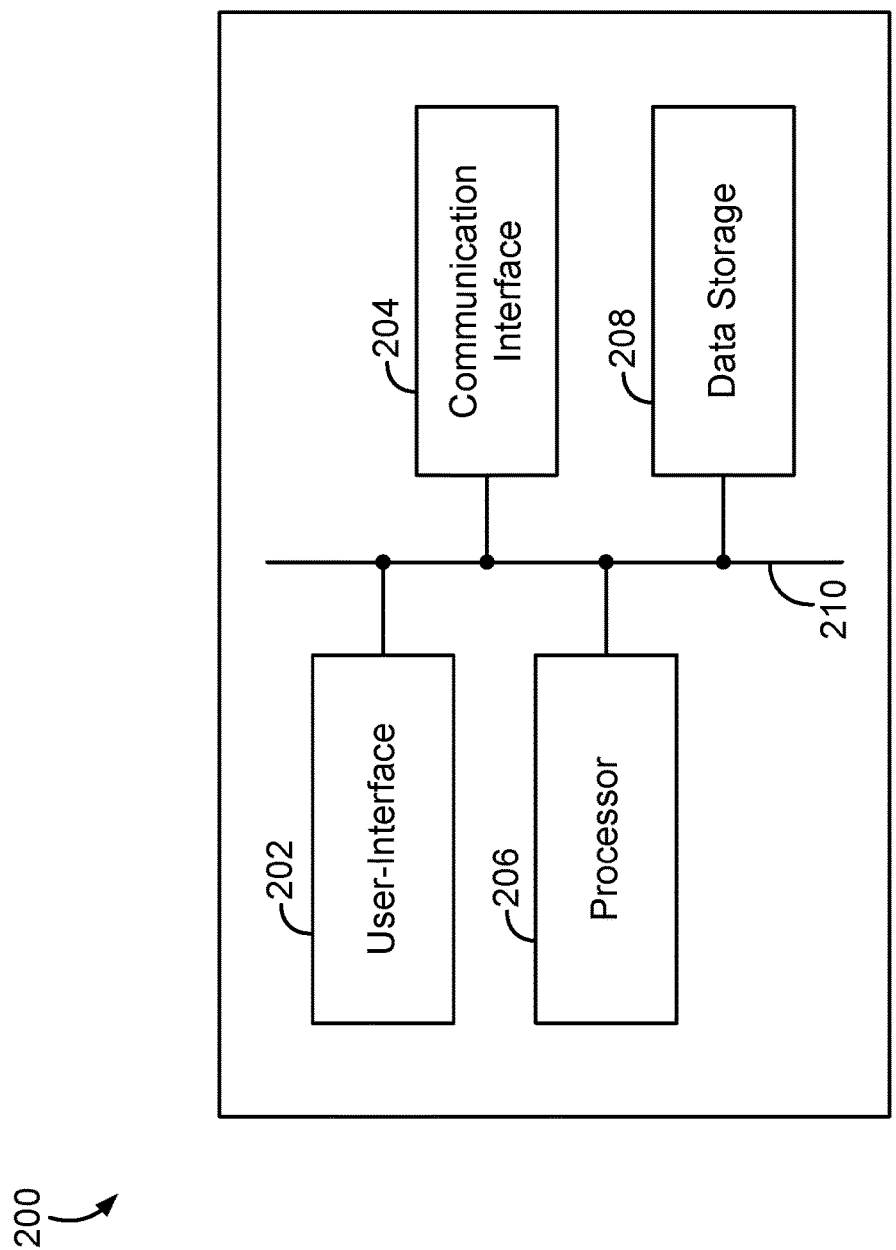
FIG. 2 is a simplified diagram of an example device.

FIG. 2 is a simplified block diagram of a device 200. The device 200 may take a variety of forms, including for example the scheduling system 102, the player controller 104, the data storage 106, one of the players 108a-c, or the production switcher 110.

The device 200 may include various components, including for example, a user-interface 202, a communication interface 204, a processor 206, and a data storage 208, all of which may be electronically connected to each other via a system bus or other connection mechanism 210. Note that the device 200 need not include all of these components and it may include additional components.

The user-interface 202 may function to allow the device 200 to interact with a user, such as to receive input from a user and to provide output to the user. Thus, the user-interface 202 may include input components such as a computer mouse, a keyboard, or a touch-sensitive panel. The user-interface 202 may also include output components such as a display screen (which, for example, may be combined with a touch-sensitive panel) or a speaker.

The communication interface 204 may function to allow the device 200 to communicate with other devices. In one example, the communication interface 204 may take the form of a wired interface, such as an Ethernet port, USB port, or High-Definition Multimedia Interface (HDMI) port. As another example, the communication interface 204 may take the form of a wireless interface, such as a WiFi interface. In either case, the communication interface 204 may include communication input and/or communication output interfaces.

The processor 206 may include one or more general purpose processors (e.g., microprocessors) and/or one or more special purpose processors (e.g., digital signal processors (DSPs)).

The data storage 208 may include one or more volatile and/or non-volatile storage components, such as magnetic, optical, flash, or organic storage, and may be integrated in whole or in part with the processor 206. The data storage 208 may include removable and/or non-removable components. In some examples, the data storage 208 may include multiple storage drives that store data in a redundant and/or stripped configuration.

Generally, the processor 206 may be configured to execute program instructions (e.g., compiled or non-compiled program logic and/or machine code) stored in the data storage 208 to perform one or more of the functions described herein and/or shown in the accompanying drawings. As such, the data storage 208 may take the form of a non-transitory computer-readable storage medium, having stored thereon program instructions that, upon execution by the processor 206, cause the device 200 to perform one or more of the functions described herein and/or shown in the accompanying drawings.

III. Example Rundown

Figure 3A:
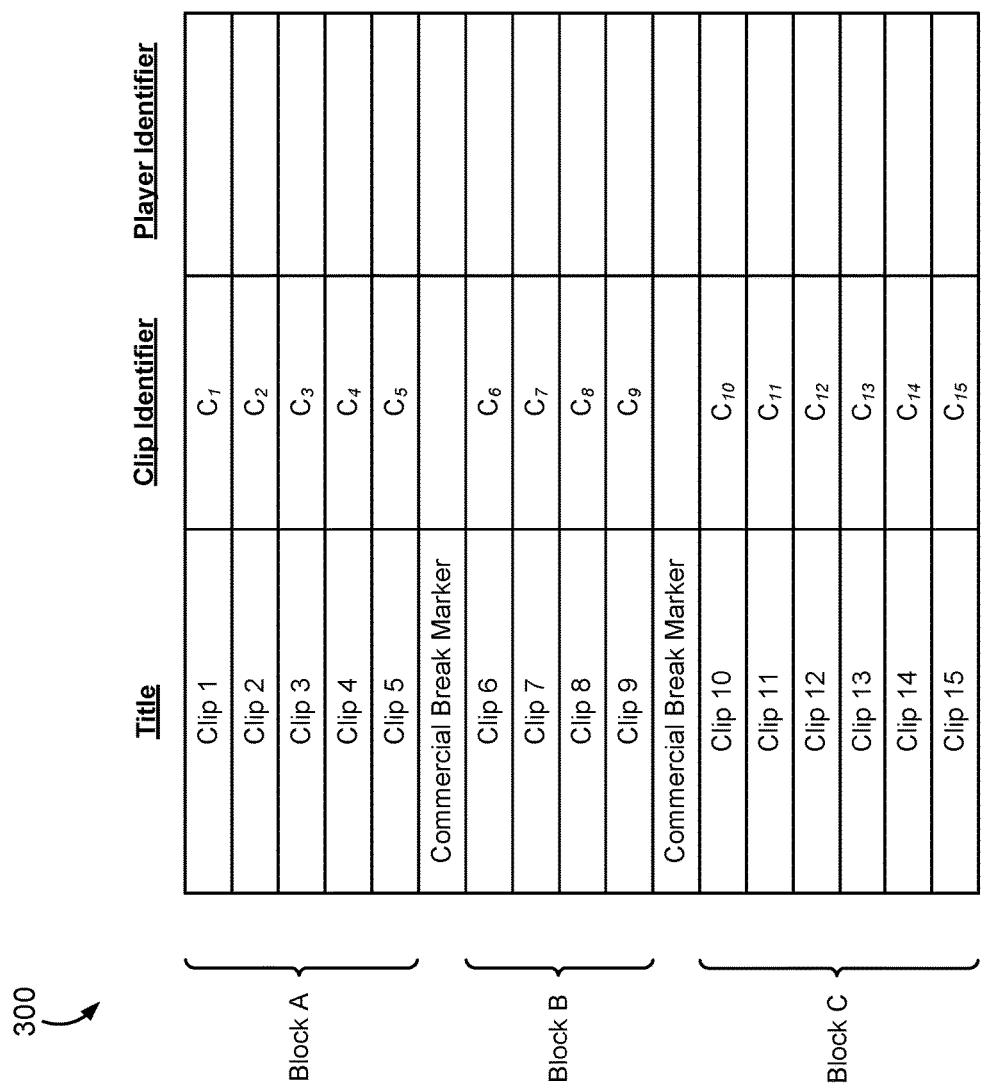
FIG. 3A is a diagram of an example rundown in a first state.

FIG. 3A shows portions of an example rundown 300 for a news program. The rundown 300 includes ordered rundown entries, each represented as a separate row. Each rundown entry includes one or more attributes, such as a title, a clip identifier and/or a player identifier, as shown in the respective columns. For example, the first rundown entry has a title "Clip 1" and a clip identifier "$C_1$." As another example, the sixth rundown entry has a title "Commercial Break Marker." In one example, a user may create the rundown 300 via a user interface of a scheduling system and store the rundown in a data storage of the scheduling system.

As discussed above, a rundown may include commercial break markers that divide the rundown into multiple blocks.

In one example, the rundown may include commercial break markers as their own rundown entries. As shown, the rundown 300 includes two commercial break markers that divide the rundown into Block A, Block B, and Block C.

Notably, each of FIGS. 3A-3F shows the rundown 300 in a different state. For instance, FIG. 3A shows the rundown in a first state where player identifiers have not yet been added to the rundown. The additional states of the rundown as shown in FIGS. 3B-3F are described below in conjunction with examples of the disclosed method.

It should also be noted that the rundown 300 has been greatly simplified for the purposes of providing examples of the disclosed system and method. In practice, a rundown is likely, although not required, to include significantly more data. For example, a rundown may include additional rundown entries that correspond to events other than playing out clips. Such rundown entries may be arranged before, after, or in between the example rundown entries described above. Further, in some instances, a given rundown entry may correspond to multiple events. As such, in one example, a rundown entry may include multiple clip identifiers (and corresponding assigned player identifiers).

In addition, rundown entries may include additional attributes, including for example, an index or "page" number, an estimated duration, an actual duration, and/or an author. Further, each rundown entry may include a script that, when executed, causes certain NPS-related functions to be performed. Also, in some instances, a rundown entry may include multiple clip identifiers and/or respective player identifiers. However, as noted above, for the sake of simplicity, the simplified rundown 300 is provided herein.

III. Example Operations

An example of the disclosed method will now be described principally in connection with a NPS and a news program. However, as noted above, the disclosed method can extend to apply with respect to other types of systems and other types of programs or other video. For instance, the disclosed method may be applied with respect to a master control system.

Figure 4:
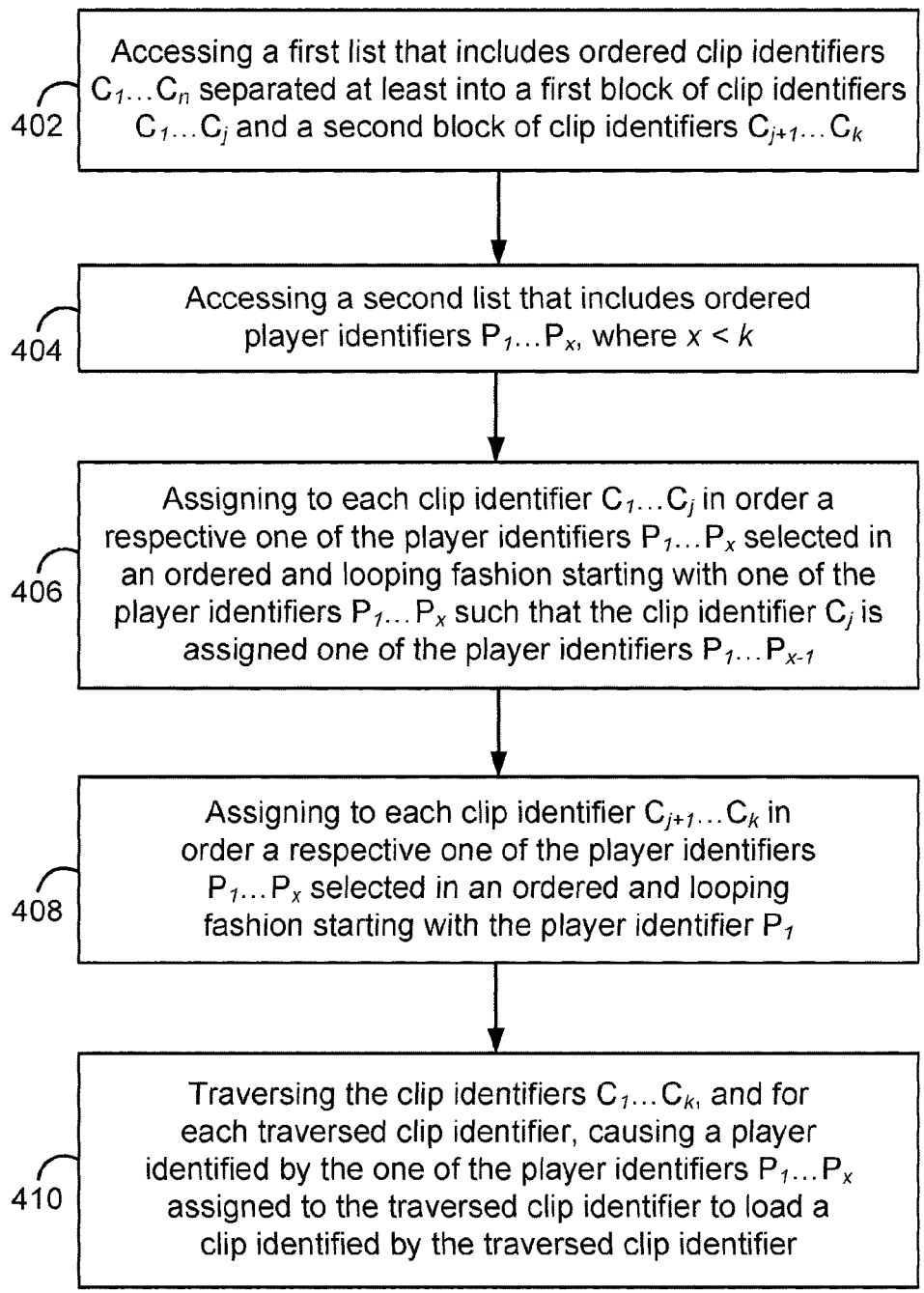
FIG. 4 is a flowchart showing functions of a first example of the disclosed method.

FIG. 4 is a flowchart showing functions of a first example of the disclosed method. At block 402, the method may involve accessing (e.g., from a local or remote data storage) a first list that includes ordered clip identifiers $C_1 \ldots C_n$ separated at least into a first block of clip identifiers $C_1 \ldots C_j$ and a second block of clip identifiers $C_{j+1} \ldots C_k$. For example, as shown in FIG. 3A, this may involve the scheduling system 102 accessing the rundown 300 that includes ordered clip identifiers $C_1 \ldots C_{15}$ separated at least into a Block A of clip identifiers $C_1 \ldots C_5$, a Block B of clip identifiers $C_6 \ldots C_9$, and a Block C of clip identifiers $C_{10} \ldots C_{15}$. In one example, the scheduling system 102 may access the rundown 300 from a data storage.

At block 404, the method may involve accessing (e.g., from a local or remote data storage) a second list that includes ordered player identifiers $P_1 \ldots P_x$, where x<k. For example, this may involve the scheduling system 102 accessing a list of player identifiers $P_1 \ldots P_3$, where each identifier identifies one of the players 108a-c. For instance, player identifier $P_1$ may identify player 108a, player identifier $P_2$ may identify player 108b, and player identifier $P_3$ may identify player 108c. In one example, the scheduling system 102 may access the second from a data storage.

At block 406, the method may involve assigning to each clip identifier $C_1 \ldots C_j$ in order a respective one of the player identifiers $P_1 \ldots P_x$ selected in an ordered and looping fashion starting with one of the player identifiers $P_1 \ldots P_x$ such that the clip identifier $C_j$ is assigned one of the player identifiers $P_1 \ldots P_{x-1}$.

For example, this may involve the scheduling system 102 assigning to each clip identifier $C_1 \ldots C_5$ in order a respective one of the player identifiers $P_1 \ldots P_3$ selected in an ordered and looping fashion starting with the player identifiers $P_1$. As shown in FIG. 3B, this causes the clip identifiers in Block A to be assigned player identifiers as follows: $C_1$ is assigned $P_1$, $C_2$ is assigned $P_2$, $C_3$ is assigned $P_3$, $C_4$ is assigned $P_1$, and $C_5$ is assigned $P_2$.

Figure 3C:
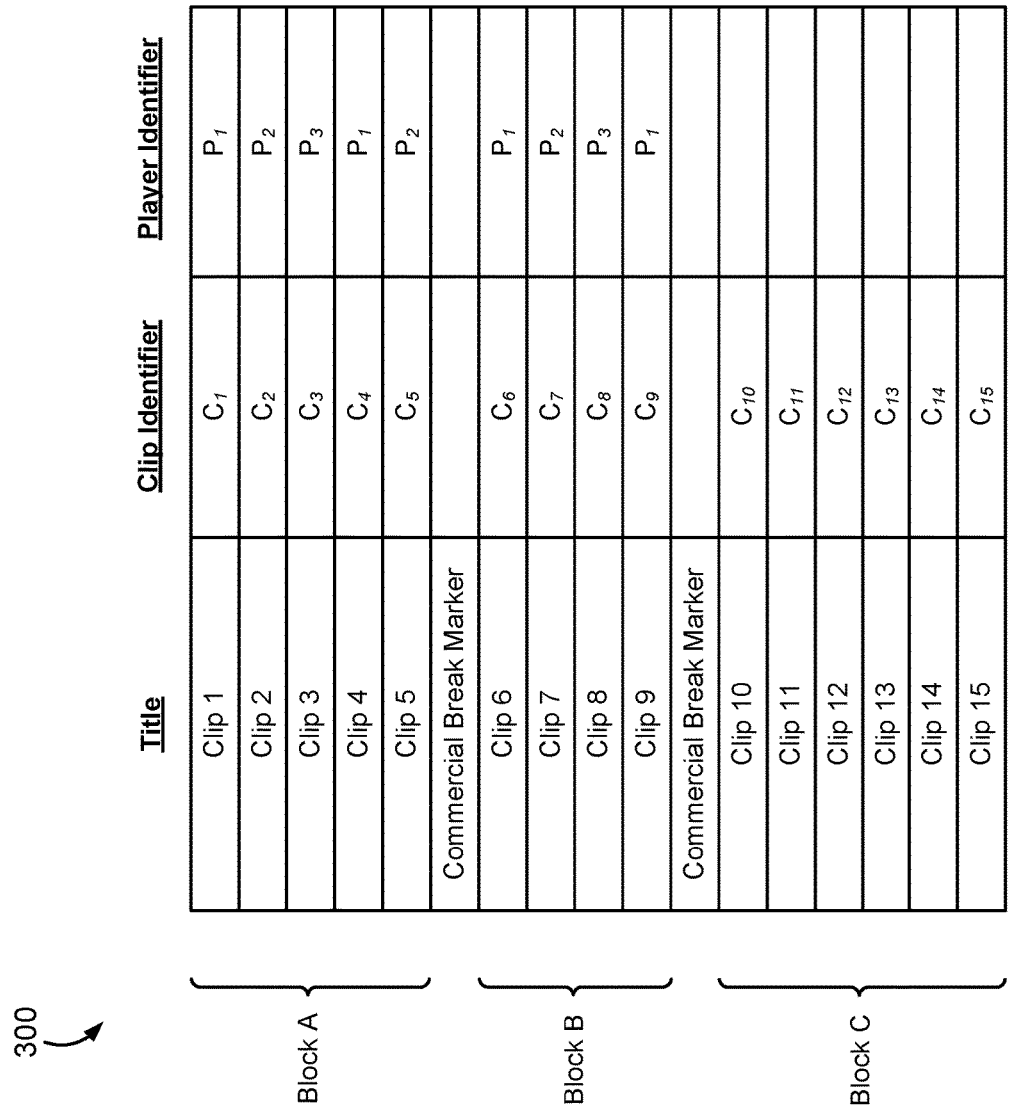
FIG. 3C is a diagram of the example rundown of FIG. 3A, in a third state.

At block 408, the method may involve assigning to each clip identifier $C_{j+1} \ldots C_k$ in order a respective one of the player identifiers $P_1 \ldots P_x$ selected in an ordered and looping fashion starting with the player identifier $P_1$. For example, this may involve the scheduling system 102 assigning to each clip identifier $C_6 \ldots C_9$ in order a respective one of the player identifiers $P_1 \ldots P_3$ selected in an ordered and looping fashion starting with the player identifier $P_1$. As shown in FIG. 3C, this causes the clip identifiers in Block B to be assigned player identifiers as follows: $C_6$ is assigned $P_1$, $C_7$ is assigned $P_2$, $C_8$ is assigned $P_3$, and $C_9$ is assigned $P_1$.

Figure 3D:
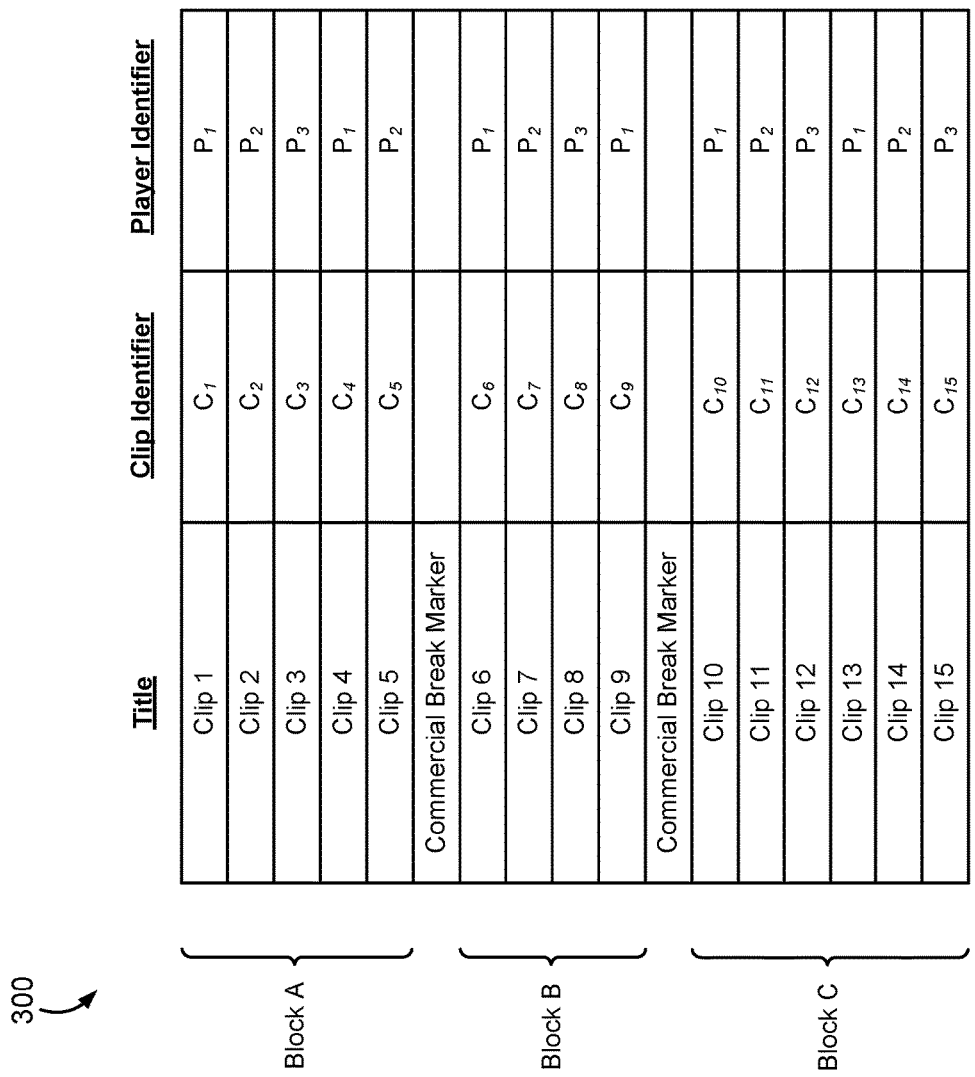
FIG. 3D is a diagram of the example rundown of FIG. 3A, in a fourth state.

Note that the function at block 408 may be repeated in a like manner for each subsequent block of clip identifiers after the second block. For instance, the method may involve the scheduling system 102 assigning to each clip identifier $C_{10} \ldots C_{15}$ in order a respective one of the player identifiers $P_1 \ldots P_3$ selected in an ordered and looping fashion starting with the player identifier $P_1$. As shown in FIG. 3D, this causes the clip identifiers in Block C to be assigned player identifiers as follows: $C_{10}$ is assigned $P_1$, $C_{11}$ is assigned $P_2$, $C_{12}$ is assigned $P_3$, $C_{13}$ is assigned $P_1$, $C_{14}$ is assigned $P_2$, and $C_{15}$ is assigned $P_3$.

In one example, the scheduling system 102 may perform the function at block 408 in response to the scheduling system 102 making a determination that the clip identifier $C_{j+1}$ is an initial clip identifier of a block of the rundown. The scheduling system 102 may make this determination in a variety of ways. For instance, the scheduling system 102 may make this determination by determining that the clip identifier $C_{j+1}$ corresponds to a first rundown entry that immediately follows a second rundown entry, and by determining that the second rundown entry corresponds to a commercial break marker (e.g., based on a value in the corresponding rundown entry).

At block 410, the method may involve traversing the clip identifiers $C_1 \ldots C_k$, and for each traversed clip identifier, causing a player identified by the one of the player identifiers $P_1 \ldots P_x$ assigned to the traversed clip identifier to load a clip identified by the traversed clip identifier. For example, the method may involve the scheduling 102 system traversing the clip identifiers $C_1 \ldots C_{10}$, and for each traversed clip identifier, the scheduling system 102 causing a player identified by the one of the player identifiers $P_1 \ldots P_3$ assigned to the traversed clip identifier to load a clip identified by the traversed clip identifier.

Notably, in the instance where the first list is divided into more than a first block and a second block as described above, the function at block 410 may involve traversing more clip identifiers, such as the clip identifiers $C_1 \ldots C_n$. For example, the method may involve the scheduling system 102 traversing the clip identifiers $C_1 \ldots C_{15}$, and for each traversed clip identifier, the scheduling system 102 causing a player identified by the one of the player identifiers $P_1 \ldots P_3$ assigned to the traversed clip identifier to load a clip identified by the traversed clip identifier.

In one example, the function at block 410 may involve the scheduling system 102 sending the traversed clip identifiers and the respectively assigned player identifiers to the player controller 104. In turn, the player controller 104 may (i) map the player identifiers to the players 108*a-c*, (ii) map the clip identifiers to clips, and (iii) cause the players 108*a-c* to load the respective, mapped clips. The player controller 104 may cause the players 108*a-c* to load the respective mapped clips by sending suitable instructions to the players 108*a-c*, for instance.

In one example, one or more of the players 108*a-c* may load a clip contemporaneously while another one of the players 108*a-c* plays out a loaded clip. In this context, the player controller 104 may monitor the status of one of the players 108*a-c* to determine when the monitored player finishes playing out its previously loaded clip. In response to making this determination, the player controller 104 may then cause the monitored player 108*a-c* to load its next clip. This way, the players 108*a-c* collectively may be able to playout each clip indicated in the rundown in order and without any undesired delay.

Each of the players 108*a-c* may be configured to play out a clip in response to receiving a request. Likewise, the production switcher 110 may be configured to set a given input-to-output mapping (e.g., to map one of its physical inputs to one of its physical output) in response to receiving a request. As such, in response to one of the players 108*a-c* and the production switcher 110 receiving suitable requests, the player 108*a-c* may playout a clip that gets channeled through the production switcher 110 and made part of the news program.

The clip may be made part of the news program in a variety of way. For instance, the production switcher 110 may run a DVE (e.g., as indicated in a rundown) that combines video from one or more physical inputs to produce the news program. For example, the output video may include live video of a news anchor discussing a news story while a clip related to that news story plays in a box over the news anchor's shoulder.

In one example, a user may provide the requests described above directly to one of the players 108*a-c* and/or to the production switcher 110. Alternatively, the scheduling system 102 may be configured to send such requests. This type of scheduling system 102 may be configured to traverse a rundown one rundown entry at a time (e.g., in response to a user pressing a spacebar key on a keyboard). Then, when the scheduling system 102 traverses a rundown entry that corresponds to a clip, the scheduling system 102 may automatically send (i) a request to the one of the players 108*a-c* assigned to the clip to play out the clip, (ii) and a request to the production switcher 110 to set the appropriate input-to-output mapping such that the production switcher 110 may use the clip as part of the news program. In one example, the scheduling system 102 may cause the one of the players 108*a-c* and the production switcher 110 to perform these functions at or about the same time.

Notably, in some examples, the scheduling system 102 may send requests to one of the players 108*a-c* and/or the production switcher 110 via other entities. For instance, the scheduling system 102 may send a request to the player controller 104, which in turn may send the request to the one of the players 108*a-c*.

In one example, the scheduling system 102 may perform the functions at blocks 406 and 408 in response to the scheduling system 102 making a determination that the rundown has been initialized or edited. A rundown may be initialized (sometimes referred to as "MOS activated") at a predetermined time and/or in response to a request from a user, but in either case before the corresponding news program is produced. This initialization process therefore allows the scheduling system 102 to assign players to clips in the manner described above before the news program is produced.

A rundown may also be edited at any time, including perhaps while the news program is being produced. For example, consider the rundown 300 as shown in FIG. 3D. In one example, a user may edit the rundown 300 to remove clip identifiers $C_2$ and $C_3$. As shown in FIG. 3E, the edited rundown 300 now includes a Block A having clip identifiers $C_1$, $C_4$, and $C_5$ (with each still being assigned player identifiers $P_1$, $P_1$, and $P_2$, respectively). Notably, this editing causes the undesired result of the same player (identified as $P_1$) being scheduled to playout two clips in a row without any intervening delay. As discussed above, due to the delay time required to load a clip, this may present an issue.

This may also present another issue that relates to the production switcher 110 running a DVE. To illustrate, consider an instance where the production switcher 102 attempts to run a DVE that visually "slides out" Clip 1, and contemporaneously visually "slides in" Clip 4. To effectively run this DVE, two separate players are needed as two clips must be played out contemporaneously. As such, based on the rundown 300 as shown in FIG. 3E, the production switcher 110 cannot effectively run this DVE in connection with Clips 1 and 4.

Figure 3F:
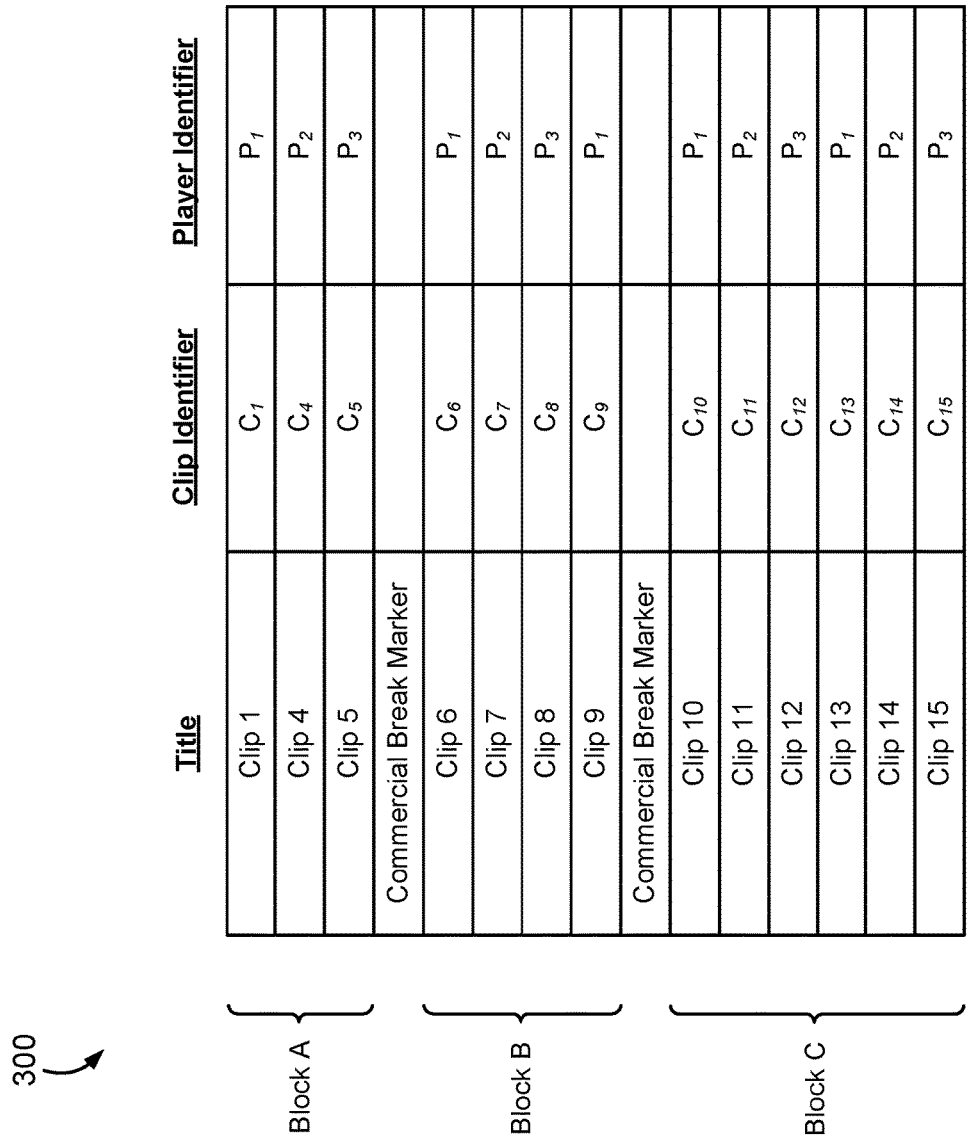
FIG. 3F is a diagram of the example rundown of FIG. 3A, in a sixth state.

However, due to scheduling system 102 performing the functions at blocks 406 and 408 in response to making a determination that the rundown 300 has been edited, the scheduling system 102 may assign different player identifiers to the clip identifiers in Block A. In particular, as shown in FIG. 3F, this causes the clip identifiers in Block A to be assigned player identifiers as follows: $C_1$ is assigned $P_1$, $C_4$ is assigned $P_2$, and $C_5$ is assigned $P_3$.

As a result, the player identified as $P_1$ has a strong likelihood of having a sufficient amount of time to load the clip identified as $C_4$ before needing to play it out. Further since the clips identified as $C_1$ and $C_4$ are now scheduled to be played out of different players, the production switcher 110 can effectively run the DVE described above.

It should also be noted that assignments for the clip identifiers in the remaining blocks (i.e., Block B and Block C) remain unchanged.

Figure 5:
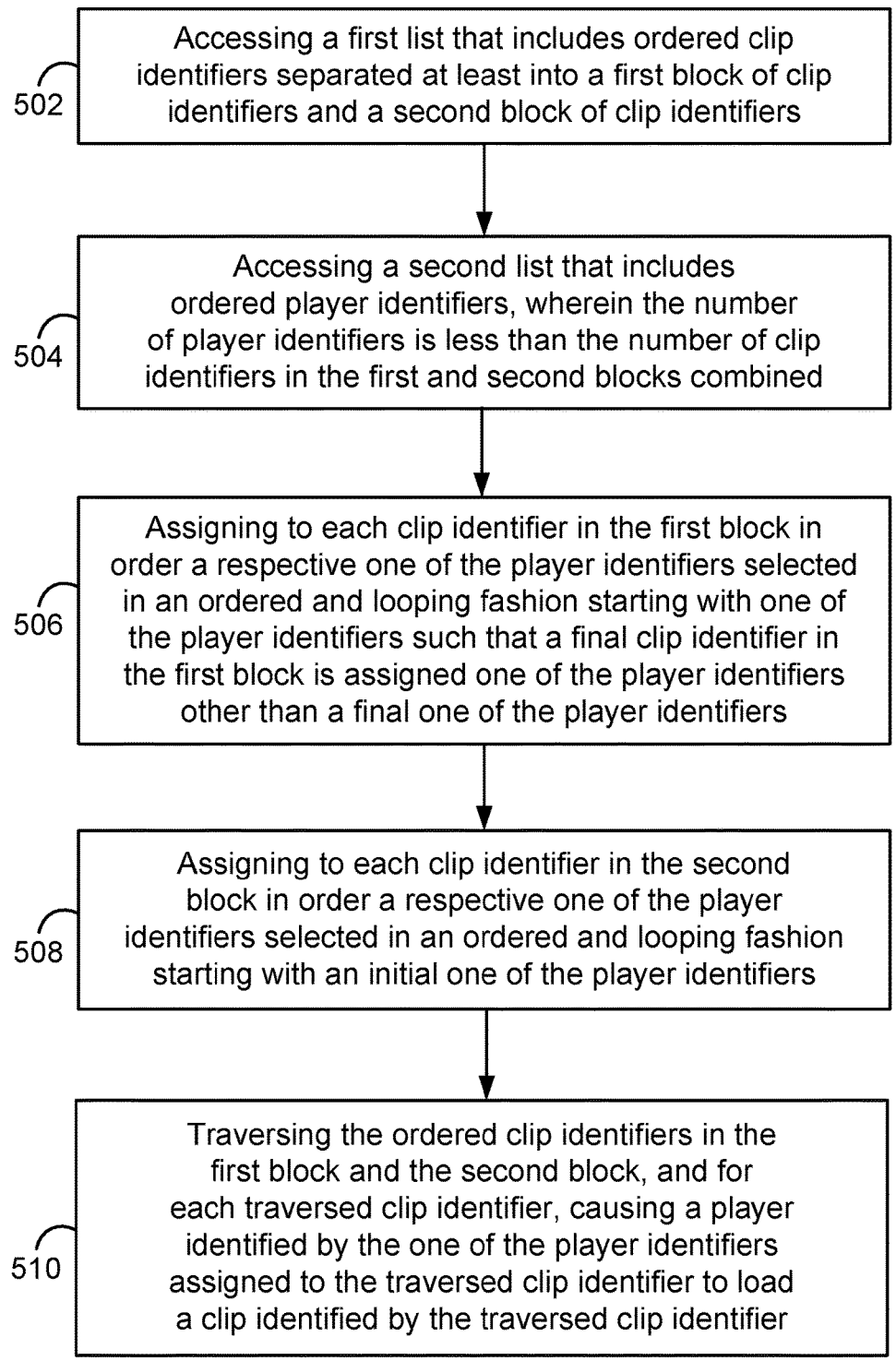
FIG. 5 is a flowchart showing functions of a second example of the disclosed method.

FIG. 5 is a flowchart showing functions of a second example of the disclosed method.

At block 502, the method may involve accessing a first list that includes ordered clip identifiers separated at least into a first block of clip identifiers and a second block of clip identifiers.

At block 504, the method may involve accessing a second list that includes ordered player identifiers, wherein the number of player identifiers is less than the number of clip identifiers in the first and second blocks combined.

At block 506, the method may involve assigning to each clip identifier in the first block in order a respective one of the player identifiers selected in an ordered and looping fashion starting with one of the player identifiers such that a final clip identifier in the first block is assigned one of the player identifiers other than a final one of the player identifiers.

At block 508, the method may involve assigning to each clip identifier in the second block in order a respective one of the player identifiers selected in an ordered and looping fashion starting with an initial one of the player identifiers.

At block 510, the method may involve traversing the ordered clip identifiers in the first block and the second block, and for each traversed clip identifier, causing a player identified by the one of the player identifiers assigned to the traversed clip identifier to load a clip identified by the traversed clip identifier.

It should also be noted that the variations described in connection with the first example method may likewise be applied to the second example method.

VII. Example Variations

While one or more functions have been described as being performed by certain devices or entities (e.g., the scheduling system 102), the functions may be performed by any device or entity, such as those included in the NPS 100 described above.

For instance, rather than the scheduling system 102 assigning player identifiers to clip identifiers, the scheduling system 102 may send clip identifiers to the player controller 104 such that the player controller 104 may assign player identifiers to clip identifiers. Then, the player controller 104 may send to the scheduling system 102, an indication of such assignments such that the scheduling system 102 may edit the rundown accordingly.

As noted above, while examples of the disclosed method have been described in connection with an NPS and a news program, examples of the method may be implemented in other environments and/or in connection with other programs or other types of video. For instance, in one example, the disclosed method may be implemented in connection with a master control system. A master control system may facilitate the broadcast of a program according to a traffic schedule (sometimes referred to as a "traffic log"), which specifies an order of events that relate to a broadcast for a given station during a given time period. According to one example variation, in connection with the method described above, rather than being part of a rundown, the first list may be part of a traffic schedule for a program broadcast. In this instance, the described first block of clip identifiers may correspond to a first block of the program broadcast, and the described second block of clip identifiers may correspond to a second block of the program broadcast. The first block of clip identifiers and the second block of clip identifiers may be separated from each other by a particular portion of the traffic schedule, such as a reference to a particular video source, for instance.

Also, the functions need not be performed in the disclosed order, although in some examples, an order may be preferred. And not all functions need to be performed to achieve the desired advantages of the disclosed system and method, and therefore not all functions are required.

It should also be noted that the variations described in connection with select examples of the disclosed system and method may be applied to all other examples of the disclosed system or method.

Further, while select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

The invention claimed is:

1. A system for use with multiple video players, the system comprising a computer-readable medium including a set of program instructions, that when executed, cause performance of a set of functions comprising:

accessing a first list that includes ordered clip identifiers separated at least into a first block of clip identifiers and a second block of clip identifiers;

accessing a second list that includes ordered player identifiers, wherein the number of player identifiers is less than the number of clip identifiers in the first and second blocks combined;

assigning to each clip identifier in the first block in order a respective one of the player identifiers selected in an ordered and looping fashion starting with one of the player identifiers such that a final clip identifier in the first block is assigned one of the player identifiers other than a final one of the player identifiers;

assigning to each clip identifier in the second block in order a respective one of the player identifiers selected in an ordered and looping fashion starting with an initial one of the player identifiers; and traversing the ordered clip identifiers in the first block and the second block, and for each traversed clip identifier, causing a video player identified by the one of the player identifiers assigned to the traversed clip identifier to load a clip identified by the traversed clip identifier.

2. The system of claim 1, wherein assigning to each clip identifier in the first block in order a respective one of the player identifiers selected in an ordered and looping fashion starting with one of the player identifiers comprises assigning to each clip identifier in the first block in order a respective one of the player identifiers selected in an ordered and looping fashion starting with starting an initial one of the player identifiers.

3. The system of claim 1, wherein the set of functions further comprises:

making a determination that an initial clip identifier of the first block is an initial clip identifier of a block of a rundown, wherein assigning to each clip identifier in the second block in order a respective one of the player identifiers selected in an ordered and looping fashion starting with an initial one of the player identifiers occurs in response to making the determination.

4. The system of claim 1, wherein the first list is part of a rundown for a news program, wherein the first block of clip identifiers corresponds to a first block of the news program, and wherein the second block of clip identifiers corresponds to a second block of the news program.

5. The system of claim 1, wherein the first list is part of a traffic schedule for a program broadcast, wherein the first block of clip identifiers corresponds to a first block of the program broadcast, and wherein the second block of clip identifiers corresponds to a second block of the program broadcast.

6. The system of claim 1, wherein at least one of the players comprises one of a video player device and a software-based video player executing on a computing device.

7. A computing device comprising:

a processor; and a non-transitory computer-readable medium having stored thereon program instructions that when executed by the processor cause the computing device to perform a set of functions comprising:

accessing a first list that includes ordered clip identifiers $C_1 \ldots C_n$ separated at least into a first block of clip identifiers $C_1 \ldots C_j$ and a second block of clip identifiers $C_{j+1} \ldots C_k$;

accessing a second list that includes ordered player identifiers $P_1 \ldots P_x$, wherein $x<k$;

assigning to each clip identifier $C_1 \ldots C_j$, in order a respective one of the player identifiers $P_1 \ldots P_x$ selected in an ordered and looping fashion starting with one of the player identifiers $P_1 \ldots P_x$ such that the clip identifier $C_j$ is assigned one of the player identifiers $P_1 \ldots P_{x-1}$;

assigning to each clip identifier $C_{j+1} \ldots C_k$ in order a respective one of the player identifiers $P_1 \ldots P_x$ selected in an ordered and looping fashion starting with the player identifier $P_1$; and traversing the clip identifiers $C_1 \ldots C_k$, and for each traversed clip identifier, causing a video player identified by the one of the player identifiers $P_1 \ldots P_x$ assigned to the traversed clip identifier to load a clip identified by the traversed clip identifier.

8. The computing device of claim 7, wherein assigning to each clip identifier $C_1 \ldots C_j$, in order a respective one of the player identifiers $P_1 \ldots P_x$ selected in an ordered and looping fashion starting with one of the player identifiers $P_1 \ldots P_x$ comprises assigning to each clip identifier $C_1 \ldots C_j$ in order a respective one of the player identifiers $P_1 \ldots P_x$ selected in an ordered and looping fashion starting with the player identifier $P_1$.

9. The computing device of claim 7, wherein the set of functions further comprises:
making a determination that the clip identifier $C_{j+1}$ is an initial clip identifier of a block of a rundown, wherein assigning to each clip identifier $C_{j+1} \ldots C_k$ in order a respective one of the player identifiers $P_1 \ldots P_x$ selected in an ordered and looping fashion starting with the player identifier $P_1$ occurs in response to making the determination.

10. The computing device of claim 7, wherein the first list is part of a rundown for a news program, wherein the first block of clip identifiers corresponds to a first block of the news program, and wherein the second block of clip identifiers corresponds to a second block of the news program.

11. The computing device of claim 10, wherein the rundown comprises a commercial-break marker, and wherein the first block of clip identifiers and the second block of clip identifiers are separated from each other by the commercial-break marker.

12. The computing device of claim 10, wherein the set of functions further comprises:
making a determination that the rundown has been initialized or edited, wherein assigning to each clip identifier $C_1 \ldots C_j$ in order a respective one of the player identifiers $P_1 \ldots P_x$ selected in an ordered and looping fashion starting with one of the player identifiers $P_1 \ldots P_x$ such that the clip identifier $C_j$ is assigned one of the player identifiers $P_1 \ldots P_{x-1}$ and assigning to each clip identifier $C_{j+1} \ldots C_k$ in order a respective one of the player identifiers $P_1 \ldots P_x$ selected in an ordered and looping fashion starting with the player identifier $P_1$ occur in response to making the determination.

13. The computing device of claim 7, wherein the first list is part of a traffic schedule for a program broadcast, wherein the first block of clip identifiers corresponds to a first block of the program broadcast, and wherein the second block of clip identifiers corresponds to a second block of the program broadcast.

14. The computing device of claim 13, wherein the first block of clip identifiers and the second block of clip identifiers are separated from each other by a reference to a particular video source.

15. The computing device of claim 7, wherein the player comprises one of a video player device and a software-based video player executing on a computing device.

16. The computing device of claim 7, wherein the set of functions further comprises:
for each traversed clip identifier, causing the player identified by the one of the player identifiers $P_1 \ldots P_x$ assigned to the traversed clip identifier to play out the respective loaded clip.

17. A computing device comprising:
a processor; and
a non-transitory computer-readable medium having stored thereon program instructions that when executed by the processor cause the computing device to perform a set of functions comprising:
accessing a first list that includes ordered clip identifiers separated at least into a first block of clip identifiers and a second block of clip identifiers;
accessing a second list that includes ordered player identifiers, wherein the number of player identifiers is less than the number of clip identifiers in the first and second blocks combined;
assigning to each clip identifier in the first block in order a respective one of the player identifiers selected in an ordered and looping fashion starting with one of the player identifiers such that a final clip identifier in the first block is assigned one of the player identifiers other than a final one of the player identifiers;
assigning to each clip identifier in the second block in order a respective one of the player identifiers selected in an ordered and looping fashion starting with an initial one of the player identifiers; and
traversing the ordered clip identifiers in the first block and the second block, and for each traversed clip identifier, causing a video player identified by the one of the player identifiers assigned to the traversed clip identifier to load a clip identified by the traversed clip identifier.

18. The computing device of claim 17, wherein assigning to each clip identifier in the first block in order a respective one of the player identifiers selected in an ordered and looping fashion starting with one of the player identifiers comprises assigning to each clip identifier in the first block in order a respective one of the player identifiers selected in an ordered and looping fashion starting with starting an initial one of the player identifiers.

19. The computing device of claim 17, wherein the set of functions further comprises:
making a determination that an initial clip identifier of the first block is an initial clip identifier of a block of a rundown, wherein assigning to each clip identifier in the second block in order a respective one of the player identifiers selected in an ordered and looping fashion starting with an initial one of the player identifiers occurs in response to making the determination.

20. The computing device of claim 17, wherein the first list is part of a rundown for a news program, wherein the first block of clip identifiers corresponds to a first block of the news program, and wherein the second block of clip identifiers corresponds to a second block of the news program.

21. The computing device of claim 17, wherein the first list is part of a traffic schedule for a program broadcast, wherein the first block of clip identifiers corresponds to a first block of the program broadcast, and wherein the second block of clip identifiers corresponds to a second block of the program broadcast.

22. The computing device of claim 17, wherein at least one of the players comprises one of a video player device and a software-based video player executing on a computing device.

* * * * *